United States Patent [19]

Arai et al.

[11] Patent Number: 4,807,132
[45] Date of Patent: Feb. 21, 1989

[54] APPARATUS FOR CONTROLLING AN INTERNAL COMBUSTION ENGINE FOR VEHICLES

[75] Inventors: Kenji Arai; Kazumasa Kurihara; Hidekazu Oshizawa, all of Higashimatsuyama, Japan

[73] Assignee: Diesel Kiki Co., Ltd., Tokyo, Japan

[21] Appl. No.: 883,784

[22] Filed: Jul. 9, 1986

[30] Foreign Application Priority Data

Jul. 15, 1985 [JP] Japan .................. 60-154287

[51] Int. Cl.⁴ .............. B60K 41/18; B60K 41/10
[52] U.S. Cl. .................. 364/424.1; 192/0.076; 192/0.052; 192/3.58; 192/0.03; 74/866
[58] Field of Search ............ 364/424, 424.1; 192/0.03, 0.052, 0.076, 0.096, 0.032, 3.58; 74/866, 858

[56] References Cited

U.S. PATENT DOCUMENTS

| | | | |
|---|---|---|---|
| 4,223,573 | 9/1980 | Franssen | 74/866 |
| 4,343,387 | 8/1982 | Hofbauer | 192/0.076 |
| 4,432,445 | 2/1984 | Windsor | 192/0.076 |
| 4,487,303 | 12/1984 | Boverz et al. | 192/0.052 |
| 4,509,625 | 4/1985 | Tellert | 192/0.052 |
| 4,615,425 | 10/1986 | Kobayashi et al. | 192/0.032 |
| 4,618,043 | 10/1986 | Hattori et al. | 192/0.096 |
| 4,638,898 | 1/1987 | Braun | 192/0.052 |
| 4,645,045 | 2/1987 | Takefuta | 74/866 |
| 4,662,491 | 5/1987 | Takefuta | 192/0.052 |
| 4,662,494 | 5/1987 | Wakiya et al. | 192/0.052 |
| 4,663,714 | 5/1987 | Cornell et al. | 364/424.1 |
| 4,677,880 | 7/1987 | Hattori et al. | 74/858 |
| 4,698,762 | 8/1987 | Moriya et al. | 364/442 |

FOREIGN PATENT DOCUMENTS

0160731 3/1981 Japan .................. 192/0.052
0121343 7/1983 Japan .................. 192/0.032

Primary Examiner—Parshotam S. Lall
Assistant Examiner—Ellis B. Ramirez
Attorney, Agent, or Firm—Pollock, Vande Sande & Priddy

[57] ABSTRACT

In an apparatus for controlling an internal combustion engine for a vehicle provided with an electronically controlled automatic transmission system including a friction-type clutch and a gear-type transmission, the speed of the engine is controlled in accordance with a target speed determined by whether the clutch is engaged or not, and at the moment the clutch becomes engaged, the target engine speed gradually changes from the target speed for the disengaged condition of the clutch to that for the fully engaged condition of the clutch, whereby the mechanical shock occurring at the time of the engagement of the clutch is remarkably reduced.

11 Claims, 6 Drawing Sheets

APPARATUS FOR CONTROLLING AN INTERNAL COMBUSTION ENGINE FOR VEHICLES

BACKGROUND OF THE INVENTION

The present invention relates to an apparatus for controlling an internal combustion engine for vehicles, and more particularly to an apparatus for controlling an internal combustion engine for a vehicle having an electronically controlled-type transmission system, which is capable of carrying out the automatic engaging operation of a clutch smoothly at a high efficiency.

In vehicles powered by internal combustion engines, for automating the operation of a device for changing gears including a friction-type clutch and a gear-type transmission, there has actually been used, for example, an electronically controlled-type transmission system in which actuators are provided in association with the friction-type clutch and the gear-type transmission, respectively, and the actuators are driven by control signals. The automatic clutch engaging operation in this type of conventional device is carried out as follows. When clutch engagement is required for starting the vehicle or changing gears, for example, the speed of the internal combustion engineis maintained at a required engine speed in an isochronous speed control mode wherein the engine speed is controlled so as to be maintained at a prescribed level, or an all speed control mode in which the governing operation is carried out over the entire speed range from idling engine speed to the maximum engine speed. When the operation for engaging the clutch has terminated, the control mode implemented for controlling the engine speed for the vehicle starting or gear changing operation is discontinued and the control mode is returned to the normal one for controlling the speed of the internal combustion engine (for example, to a limit speed control mode in which only the maximum engine speed and the idling engine speed are controlled and governing operation is not effected in the medium engine speed range). (See, for example, Japanese Patent Application Disclosure No. 68850/84).

However, in the case where the speed control mode of the internal combustion engine is changed-over as described above, there is the drawback of a mechanical shock occurring due to the difference in the fuel injection quantity required for the respective control modes when the isochronous or all speed control modes are changed-over to thenormal mode. In order to avoid the occurrence of such a mechanical shock, the conventional apparatus is constructed so as to use a semi-engaged condition of the clutch when the speed control mode is changed-over, whereby the shock that arises at the time of the change-over of the speed control mode is avoided.

However, when the clutch is used in the semi-engaged condition in order to avoid the occurrence of shock at the time of the change-over of the speed control mode, there is te problem of the clutch plate being subjected to intense friction and the service life of the clutch being shortened.

SUMMARY OF THE INVENTION

It is an object of the present invention to provide an improved apparatus for controlling an internal combustion engine for vehicles having an electronically controlled transmission system.

It is another object of the present invention to provide an apparatus for controlling an internal combustion engine for vehicles, which is capable of carrying out the automatic engaging operation of the friction-type clutch smoothly and at a high efficiency,w ithout employing the semi-engaging operation of the clutch.

According to the present invention, in an apparatus for controlling an internal combustion engine for a vehicle provided with an electronically controlled automatic transmission system including a friction-type clutch and a gear-type transmission,the apparatus comprises: means for producing condition data representing the operating condition of the vehicle; means responsive to the condition data for calculating second target data representing the amount of fuel injection necessary for operating the internal combustion engine at a reuired fixed speed in a predetermined specific speed control mode; means for producing a detection signal indicating the operating condition of the friction-type clutch; means responsive to the first and second target data and the detection signal for producing third target data representing a target amount of fuel injection which gradually changes from the fuel quantity represented by the second target data to the fuel quantity represented by the first target data with the passage of time when the friction-type clutch is changed-over from a disengaged state to an engaged state; a selecting means responsive to the first, second, and third target data and the detection signal for selecting one data from amongst the first, second and third target data according to the operating condition of the friction-type clutch; and means for controlling the amount of fuel supplied to the internal combustion engine in accordance with the target data selected by the selecting means.

When the friction-type clutch is engaged and the vehicle is cruising, the first target data is selected by the selecting means, and the amount of fuel injection to the internal combustion engine is controlled in accordance with the first target data. As a result, the internal combustion engine is operated in a predetermined normal control mode, for example, an operation control mode in compliance with a limit speed characteristic, and the vehicle is operated in accordance with the amount of operation of the accelerator pedal.

The selecting means operates in response to the detection signal when the friction-type clutch is put into its disengaged state for starting the vehicle or changing gears of the gear-type transmission, and the second target data is selected in place of the first target data. As a result, when the friction-type clutch is put into its disengaged state and the load on the internal combustion engine is reduced to approximately zero, the speed of the internal combustion engine is controlled in accordance with the first target data in either the isochronous or the all speed control mode and the engine speed is controlled so as to maintain a predetermined set speed. Consequently, an excessive rise in the speed of the internal combustion engine will not occur even when the clutch is disengaged.

After this, when it is detected, based on the detection signal, that the friction-type clutch has been changed-over from its disengaged state to its engaged state by the operation of the electronically controlled transmission system, the third target data is selected by the selecting means. The content of the third target data just after the friction-type clutch has been engaged is the same as that of the second target data, and thereafter changes so as to approach the content of the first target data with the passage of time. The first target data is selected instead of the third target data after the content of the third data is substantially the same as the content of the first target data, and the speed of the internal combustion engine is controlled in the required normal speed control mode.

When the clutch is engaged in this way, instead of suddenly changing-over the controlmode of internal combustion engine operation from either an isochronous or an all speed control mode to the required normal speed control mode, the target amount of fuel injection is gradually changed in steps or steplessly. As a result, the control condition of the engine is gradually changed into the normal speed control mode from the isochronous speed control or the all speed control mode, so that the occurrence of mechanical shock at the time of clutch engagement can be effectively eliminated.

The invention will be better understood and other objects and advantages thereof will be more apparent from the following detailed description of preferred embodiments with reference to the accompanying drawings.

DESCRIPTION OF THE PREFERRED EMBODIMENTS

Figure 1:
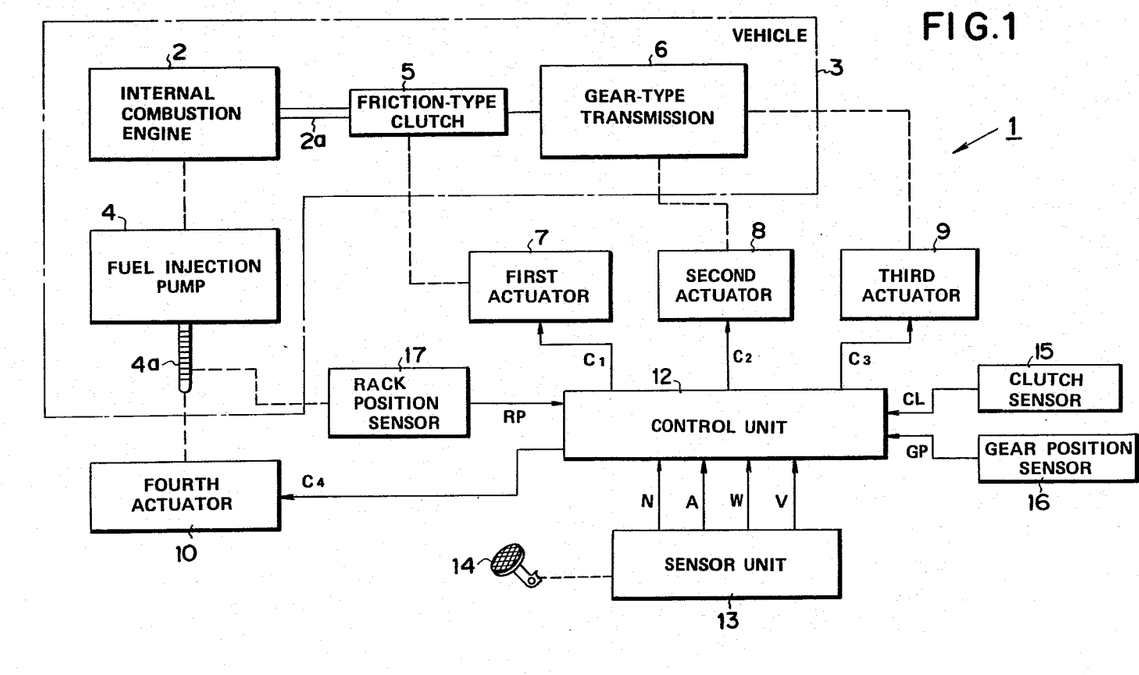
FIG. 1 is a view schematically showing an embodiment of a control apparatus for an internal combustion engine for vehicles according to the present invention.

FIG. 1 is a view schematically showing an embodiment of a control apparatus for an internal combustion engine for vehicles according to the present invention. A control apparatus 1 controls the operation for changing gears in a vehicle 3 powered by an internal combustion engine 2 and the amount of fuel injected from a fuel injection pump 4 to the internal combustion engine 2. The vehicle 3 is equipped with a friction-type clutch 5 connected to an output shaft 2a of the internal combustion engine 2, and a gear-type transmission 6 connected to the output shaft 2a through the friction-type clutch 5. A first actuator 7 controlled by an electric signal is connected to the clutch 5 and the control of the engaging/disengaging operation of the clutch 5 is carried out by the first actuator 7. The gear-type transmission 6 is connected with second and third actuators 8 and 9, which are also controlled by electric signals, and the second and third actuators 8 and 9 serve to actuate the gear-type transmission 6 for changing gears.

In order to electronically regulate the amount of fuel injected from the injection pump 4, a control rack 4a for regulating the amount of fuel injection from the fuel injection pump 4 is connected with a fourth actuator 10 for setting the position of the control rack 4a. The first through fourth actuators 7 throgh 10 are respectively controlled by first through fourth control signals $C_1$ to $C_4$ output from a control unit 12.

The control unit 12 receives speed data N representing the rotational speed of the internal combustion engine 2, acceleration data A representing the amount of operation of an accelerator pedal 14, temperature data W representing the coolant temperature of the internal combustion engine 2, and vehicle speed data V representing the cruising speed of the vehicle 3, which are supplied from a sensor unit 13. The sensor unit 13 is composed of conventional sensors of the types required for obtaining each of the above-mentioned data. The control apparatus 1 further comprises a clutch sensor 15 for producing a clutch signal CL indicating the result of the detection of the operating condition of the clutch 5, a gear position sensor 16 for producing a gear position signal GP indicating the gear position of the gear-type transmission 6, and a rack position sensor 17 for producing a rack position signal RP indicating the position of the control rack 4a. The clutch signal CL, the gear position signal GP and the rack position signal RP produced from these sensors 15, 16 and 17 are input to the control unit 12.

In the control unit 12, a calculation is performed based on the input data and input signals in order to match the gear position of the gear-type transmission 6 to the operating condition of the vehicle at that time. The first actuator 7, the second actuator 8 and the third actuator 9 are respectively driven controlled by the first, second and third control signals $C_1$, $C_2$ and $C_3$ output as a result of the above-mentioned calculation. Furthermore, a control calculation for controlling the amount of fuel injected from the fuel injection pump 4 is also carried out in the control unit 12. This control calculation is carried out on the basis of the various data from the sensor unit 13 and the signals from each of the sensors 15, 16 and 17. The fourth actuator 10 is driven controlled by the fourth control signal $C_4$ output in accordance with the result of the control calculation.

Figure 2:
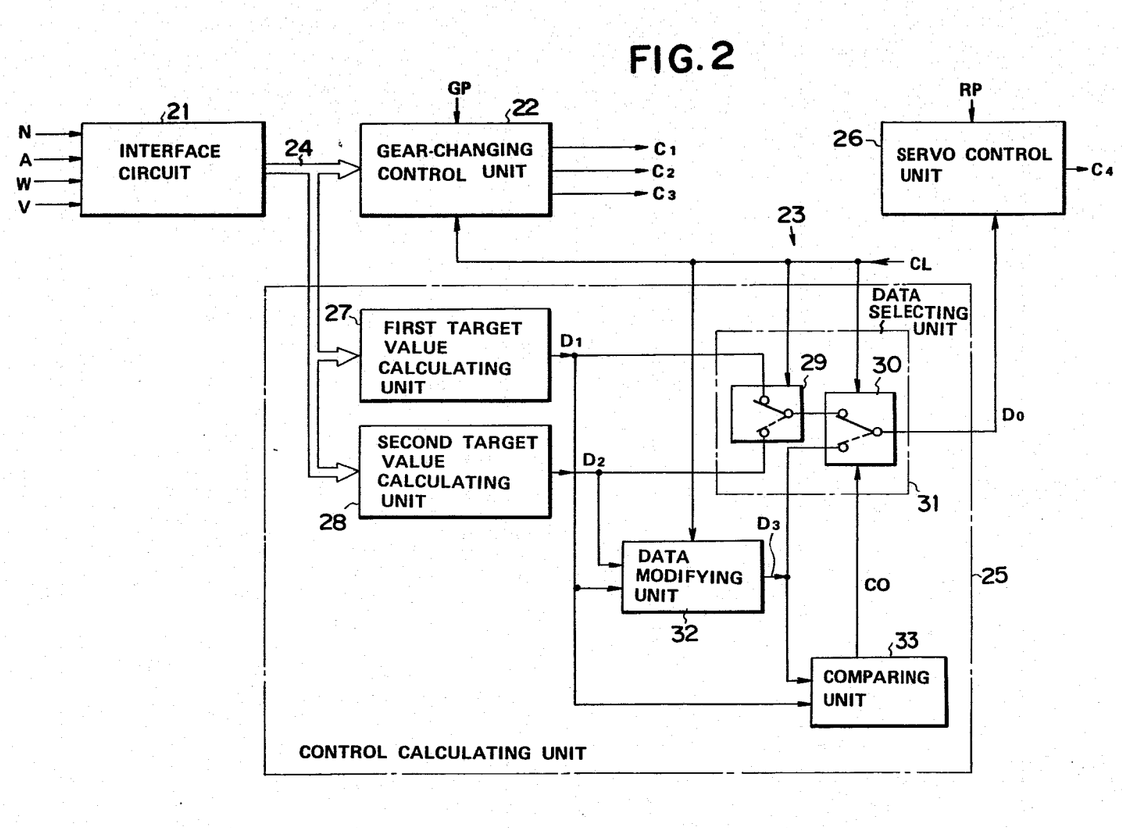
FIG. 2 is a block diagrm of the control unit shown in FIG. 1.

FIG. 2 shows a block diagram representing a construction of the control unit 12 of FIG. 1. The control unit 12 is composed of an interface circuit 21 to which the data N, A, W and V are input, a gear-changing control unit 22 for controlling the clutch 5 and the gear-type transmission 6, and an injection quantity control unit 23 for controlling the quantity of fuel injected from the fuel injection pump 4.

The speed data N, the acceleration data A, the temperature data W and the vehicle speed data V are supplied through the interface circuit 21 to a data bus 24, and the gear-changing control unit 22 receives acceleration data A, the speed data N and the vehicle speed data V through the data bus 24 in addition to the clutch signal CL and the gear position signal GP. Based on the above-mentioned data and signals, the gear-changing control unit 22 calculates and outputs the first, second and third control signals $C_1$, $C_2$ and $C_3$, which are necessary for putting the gear-type transmission 6 into the optimum gear position for the operating condition of the internal combustion engine 2 at that time. The operations of the clutch 5 and the gear-type transmission 6 are automatically executed in response to the output of these control signals $C_1$, $C_2$ and $C_3$, and the optimum gear position is obtained. That is, an electronically controlled transmission system is formed by the friction-type clutch 5, the gear-type transmission 6, the first to third actuators 7 to 9 and the gear-changing control unit 22.

The injection quantity control unit 23 is provided for matching the quanntity of fuel injected to the internal combustion engine 2 to the operating condition of the clutch 5, and comprises a control calculating unit 25 and a servo control unit 25 which is responsive to the calculation output $D_o$ from the control calculating unit 25 and the rack position signal RP and outputs the fourth control signal $C_4$ for driving the fourth actuator 10 in such a way that an injection quantity determined by the calculation output $D_o$ is obtained.

The control calculating unit 25 is provided with a first target value calculating unit 27 or calculating a target fuel quantity for controlling the engine speed in accordance with a limit speed governor characteristic on the basis of the output from the interface circuit 21 in such a way that the speed control of the internal combustion engine 2 is carried out in accordance with the limit speed control mode according to the amount of operation of the accelerator pedal 14 when the clutch 5 is in its engaged condition. The control calculating unit 28 which calculates a target fuel quantity necessary for controlling the engine speed in the isochronous speed control mode so as to maintain the speed of the internal combustion engine 2 at a prescribed speed in order to prevent the speed of the internal combustion engine 2 from rising excessively when the internal combustion engine 2 is in a no-load condition due to the clutch 5 being disengaged. First and second target data $D_1$ and $D_2$ representing the respective target fuel quantities are output from the first and second target value calculating units 27 and 28 in accordance with the results of the calculations. These first and second data $D_1$ and $D_2$ are input to a data selecting unit 31 consisting of switches 29 and 30 which operate in response to the clutch signal CL, and a data modifying unit 32.

The data modifying unit 32 outputs transient target data $D_3$ whose value changes from the target injection quantity represented by the second target data $D_2$ to the target injection amount represented by the first target data $D_1$ with the passage of time when it is detected that the clutch 5 has been changed-over fromits disengaged condition to its engaged condition in response to the clutch signal CL. The trannsient target data $D_3$ is input to the data selecting unit 31.

The construction of the data selecting unit 31 will now be described. The switch 29 receives the first and second target data $D_1$ and $D_2$ and the switch 29 is changed-over as shown by the dotted line to select the second target data $D_2$ when the clutch signal CL indicates a disengaged condition of the clutch 5. On the other hand, the switch 29 is changed-over as shown by the solid line to select the first target data $D_1$ when the clutch signal CL indicates an engaged condition of the clutch 5. The output selected by the switch 29 and the third target data $D_3$ are input to the other switch 30. The switch 30 is responsive to the clutch signal C and an output signal C from a comparing unti 33 for comparing the magnitude between the contents of the first target data $D_1$ and the third target data $D_3$, and the change-over operation thereof is carried out as follows. At first, the third target data $D_3$ is selected in response to the detection of the fact that the clutch 5 has been changed-over from its disengaged condition to its engaged condition by the clutch signal CL. The switch 30 is then switched-over so as to select the output selected by the switch 29 in response to the output signal CO becoming representative of the condition in which $D_3 \approx D_1$. This changed-over condition is maintained until the clutch 5 is changed-over from its disengaged state to its engaged state.

In the embodiment, although the data selecting unit 31 is illustrated in FIG. 2 as being constituted by the use of two switches and the data selecting unit 31 has the function of discriminating the condition of the clutch signal CL and the output signal CO as can be seen from the above description, this function can be easily realized by an electronic switch including active elements such as transistors, or can also be realized by the use of a microprocessor.

The calculation output $D_o$ output from the data selecting unit 31 is output as a command signal indicating the target fuel quantity at that time and input to the servo control unit 26.

According to this construction, both switches 29 and 30 are switched-over as illustrated by the solid lines when the clutch 5 is engaged, so that the first target data $D_1$ is input to the servo control unit 26 as calculation output $D_o$. Consequently, the internal combustion engine 2 is operated in accordance with a limit speed control mode on the basis of the first target data $D_1$ and assumes a normal speed control mode in which vehicle speed is controlled by the accelerator pedal 14. When the clutch 5 is put ito a disengaged condition because, for example, an operation for changing gear is required, only switch 29 is switched-over as illustrated by the dotten line, so that the second target data $D_2$ is input as calculation output $D_o$ to the servo control unit 26. Consequently, in this case, the internal combustion engine 2 is operated in an isochronous speed control mode and the engine speed is maintained at a predetermined level regardless of the load condition of the engine so that excessive increase in engine speed will not occur even when the clutch 5 is disengaged.

After this, when the clutch 5 is engaged by the gear-changing control unit 22, the data modifying unit 32 is operated to output the third target data $D_3$, whose content changes with the passage of time as mentioned above. Since the switch 30 of the data selecting unit 31 is switched-over as shown by the dotted line at this time, the third target data $D_3$ instead of the second target data $D_2$ is supplied to the servo control unit 26 at the same time as the clutch 5 is engaged. Since the content of the third target data $D_3$ is equal to that of the second target data at the time when the clutch 5 has just been engaged, the speed of the internal combustion engine 2 will hardly change even if the third target data $D_3$ is selected instead of the second target data $D_2$ by the selecting operation of the data selecting unit 31. Consequently, a severe mechanical shock will not occur in the internal combustion engine 2, the clutch 5 and the gear-type transmission 6 even when the clutch 5 is completely engaged. After the clutch 5 is engaged, the content of the third target data $D_3$ varies so as to approach that of the first target data $D_1$ with the passage of time. As a result, when the clutch 5 is engaged, the target injection amount is changes so as to gradually change the operation control mode of the internal combustion engine 2 from an isochronous speed control mode to a limit speed control mode. The switch 30 is switched-over by the output signal CO as shown by the solid line when it is detected by the comparing unit 33 that the content of the third target data $D_3$ has become nearly equal to the content of the first target data $D_1$. In this case, since the switch 29 is switched-over as shown in the solid line, the data selecting unit 31 selects the first target data $D_1$, and after this, the internal combustion engine 2 is operated in the limit speed control mode in accordance with the amount of operation of the accelerator pedal 14.

Figure 3:
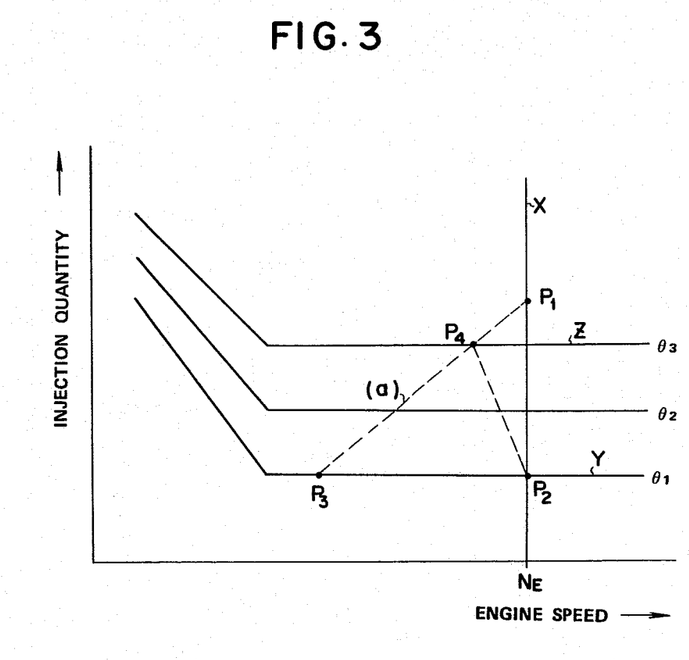
FIG. 3 is a view of characteristic curves for explaining the state of the change of the target injection quantity determined in the control unit shown in FIG. 2.

FIG. 3 shows characteristic curves for explaining the state of the change of the target injection quantity represented by the third target data $D_3$. The characteristic curves shown in FIG. 3 represents the relationship between the fuel injection quantity and the engine speed as a parameter of the amount of operation $\theta_1$, $\theta_2$ and $\theta_3$ of the acceleration pedal 14. In the case where the internal combustion engine 2 is controlled in a limit speed control mode, the fuel injection quantity and the engine speed are determined in accordance with the amount of operation of the accelerator pedal 14 and the engine load at that time. On the other hand, in the case where the internal combustion engine 2 is controlled in an isochronous speed control mode, the fuel injection amount is determined in accordance with the characteristic curve X so as to maintain a predetermined engine speed $N_E$ regardless of the magnitude of load.

The description wil be given for the case in which the internal combustion engine 2 is operated at the point $P_1$ on the characteristic curve X in the case of the isochronous speed control mode, while the operating point according to the limit speed control mode, which is the normal operation mode, is at the point $P_2$ on the characteristic curve Y due to the amount $\theta_1$ of operation of the accelerator pedal 14. When the clutch 5 is engaged and the engine speed control mode is changed, the target quantity of fuel injection gradually reduces so that the speed of the internal combustion engine 2 is lowered. As a result, the operating point moves from the point $P_1$ to the point $P_3$ along the dotted line (a), where the fuel quantity at the point $P_3$ is equal to that at the point $P_2$. Therefore, after this, the speed control mode of the internal combustion engine 2 changes into a limit speed control mode according to a limit speed characteristic. For example, when the operator becomes aware of the lowering in the engine speed and depresses the accelerator pedal 14 so as to obtain the amount $\theta_3$ of operation of the accelerator pedal 14, the actually used curve in the limit speed mode is changed from the curve Y to a curve Z. Accordingly, stable operation of the internal combustion engine 2 will be set at the point $P_4$.

As will be understood from the foregoing description, since the acceleration pedal 14 is likely to be operated in order to compensate for the variation in the engine speed when the clutch 5 is engaged, it is preferable that the modification of the target fuel quantity performed in the data modifying unit 32 be carried out at relatively low speed.

Figure 4:
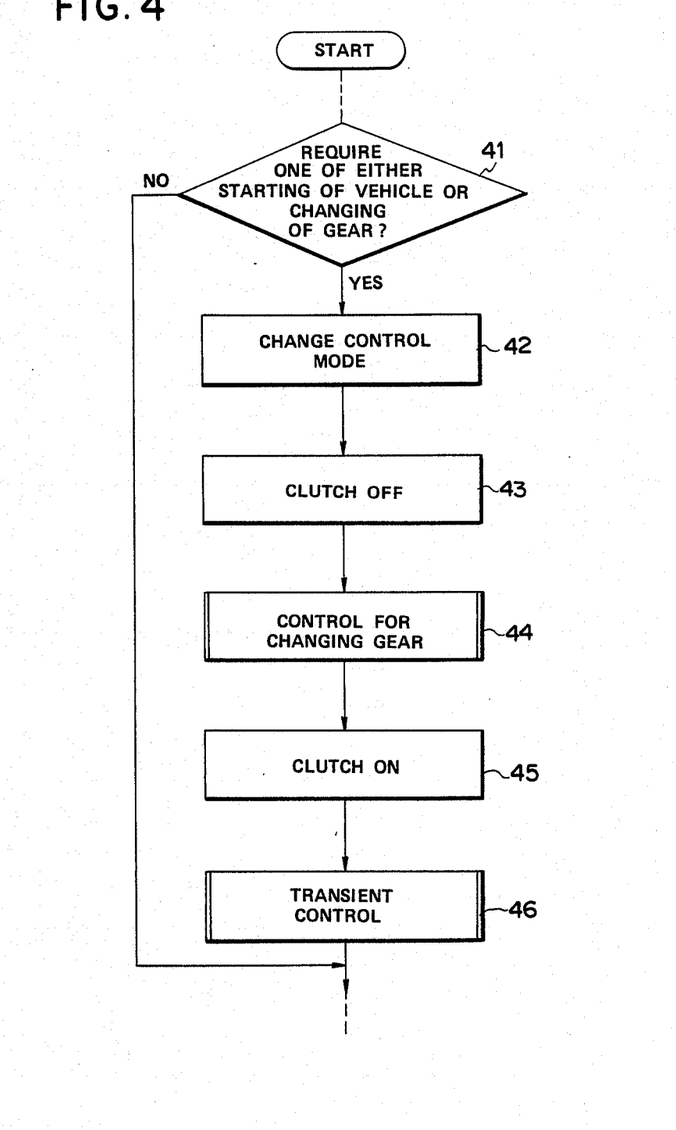
FIG. 4 is a flowchart of a control program to be executed in a microcomputer in order to realize the same function as that of the control unit shown in FIG. 2.
Figure 5:
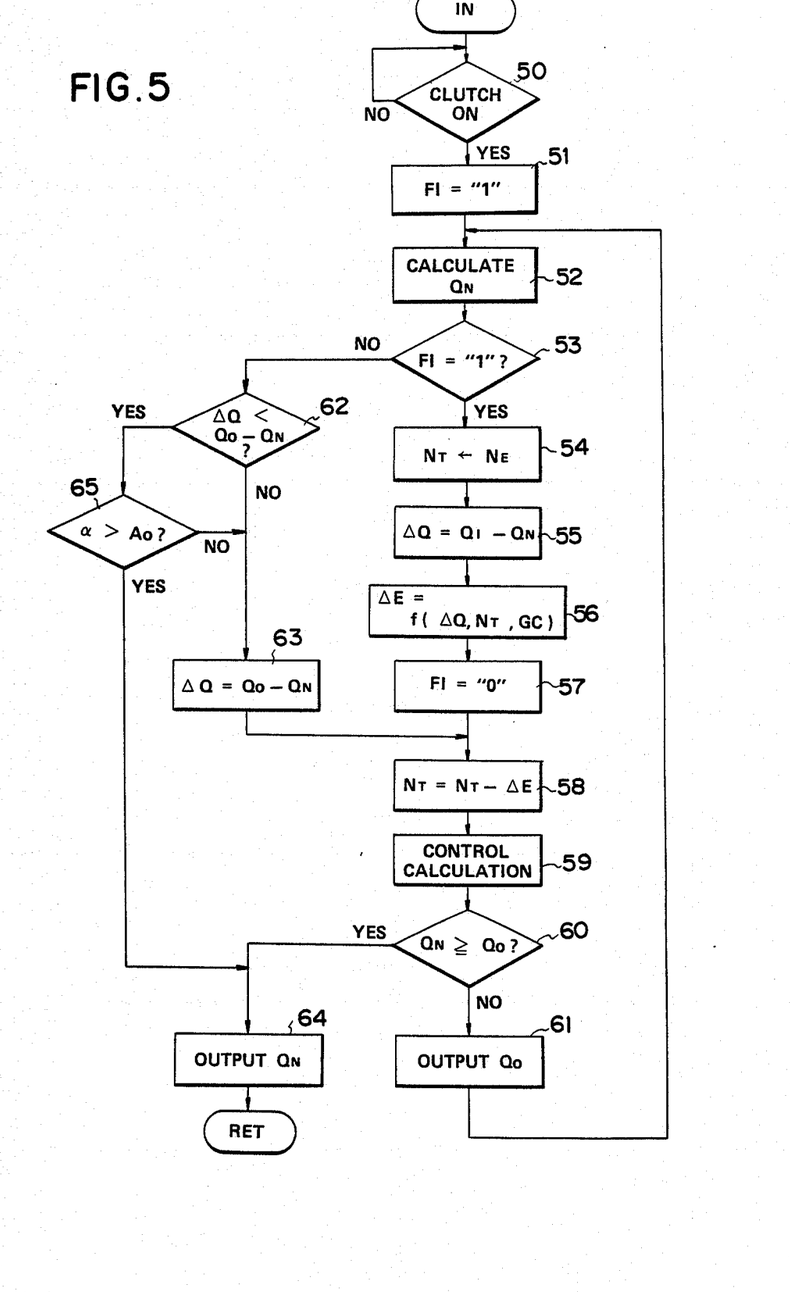
FIG. 5 is a detailed flowchart showing the transient control step of the flowchart shown in FIG. 4.

It is possible to realize the same function as that of the control unit 12 of FIG. 1 by the use of a microcomputer, and flowcharts of an example of a control program to be executed in a microcomputer are shown in FIGS. 4 and 5.

Referring to FIG. 4, after the start of the program, the operation moves to step 41 in whch a decision is made as to whether the operation for starting the vehicle or changing gears is required. When the decision in step 41 is YES, the operation moves to step 42 in which the speed control mode of the internal combustion engine 2 is changed from the normal control mode (limit speed control mode) to the isochronous speed control mode. After this, the clutch 5 is disengaged in step 43, and the operation for shifting the gear into a desired position is carried out in step 44. When the operation for changing gears is completed, the operation moves to step 45 in which the control signal for engaging the clutch 5 is produced. After this, the operation moves to step 46 in which the transient control for gradually changing the speed control mode of the internal combustion engine 2 from the isochronous speed control mode to the normal speed control mode is performed, whereby it is completely changed into the normal speed control mode. When the decision in step 41 is NO, these steps 42 through 46 are not executed.

FIG. 5 is a detailed flowchart of step 46 in FIG. 4 and a detailed description on step 46 will now be given with reference to FIG. 5.

When the operation enters into this sub-routine, the procedure moves to step 50 in which the decision is made in response to the clutch signal CL as to whether or not the friction-type clutch 5 is engaged. When the decision in step 50 is YES, the operation moves to step 51 wherein flag FI for indicating whether or not the operation is being entered for the first time is set. After this, the target fuel quantity $Q_N$ necessary for operating the internal combustion engine in accordance with the normal speed control mode is calculated in response to the amount of operation of the accelerator pedal 14 in step 52. The operation then moves to step 53 in which a decision is made as to whether the flag FI is in a set condition. When FI="1", the decision in step 53 becomes YES and the operation moves to step 54 in which the target speed $N_E$ in the isochronous speed control mode is set as a target engine speed $N_T$ which will be used as a target engine speed hereinafter. Then, the operation moves to step 55 in which the calculation is performed to obtain the difference $\Delta Q$ between a target fuel quantity $Q_f$ in the isochronous speed control mode and the target fuel quantity $Q_N$ obtained in step 52. The operation then moves to step 56 in which a map calculation for obtaining the quantity of change $\Delta E$ of the engine speed is performed in accordance with the difference $\Delta Q$, the target engine speed $N_T$ and the content GC of the gear-changing control carried out in step 44 (for example, the gear is shifted into the third position).

After this, the flag FI is reset in step 57, and the operation moves to step 58 wherein the value resulting from subtracting the quantity of change $\Delta E$ obtained in step 56 from the target engine speed $N_T$ set in step 54 is set as new target engine speed $N_T$. After this, the operation moves to step 59 in which the target fuel quantity $Q_O$ required for obtaining the target engine speed set in step 58 by the isochronous speed control mode is calculated and the calculation for PI control is carried out.

In step 60, the target fuel quantity $Q_O$ calculated in step 59 is compared with the target fuel quantity $Q_N$ calculated in step 52. When $Q_N < Q_O$, the target fuel quantity $Q_O$ is output in step 61 and the operation returns to step 52.

In step 52, the target fuel quantity $Q_N$ is calculated again in accordance with the amount of operation of the accelerator pedal 14 at that time and the operation then moves to step 53. At this time, since the flag F1 has already been reset, the decision in step 53 becomes NO, so that the operation moves to step 62 in which the decision is made as to whether or not $\Delta Q < Q_O - Q_N$, that is, it is discriminated whether or not the value resulting from subtracting the value of $Q_N$ obtained in this program cycle from the value of $Q_O$ output in the previous program cycle is larger than $\Delta Q$. When the result of the decision in step 62 is NO, it follows that the value of fuel quantty $Q_O$ is changing so as to approach the value of $Q_N$. Therefore, $Q_O-Q_N$ is set as the updated value for $\Delta Q$ in step 63 and steps 58 to 60 are executed. As a result, the value of $Q_O$ gradually approaches the value of $Q_N$ and the decision in step 60 becomes YES when $Q_N$ becomes more than or equal to $Q_O$. Thus, $Q_N$ is output as the target fuel quantity in step 64 and the operation returns to the program shown in FIG. 4.

When the decision in step 62 is YES, the operation moves to step 65 in which the decision is made as to whether the amount $\alpha$ of change in the operation amount of the acceleration pedal 14 is more than a prescribed value $A_O$. That is, the decision in step 62 becomes YES when the accelerator pedal 14 is operated during the period from the engagement of the clutch 5 to the time the speed control mode of the internal combustion engine 2 is completely changed into the normal speed control mode. When $\alpha > A_O$, the operation moves to step 64 in which $Q_N$ is output and the control is terminated. When the decision in step 65 is NO, the operation moves to step 63 to repeat the steps mentioned above, so that $Q_O$ gradually approaches $Q_N$. The embodiment shown in FIG. 5 is constructed in such a way that the target engine speed is gradually reduced and a target injection quantity corresponding to this target engine speed is calculated so that the target injection quantity becomes smaller than the target injection quantity at the normal speed control mode, resulting in the transient control being terminated. However, the present invention is by no means limited to this embodiment and is also applicable to a construction which gradually increases the target engine speed, calculate a target injection quantity corresponding to this target engine speed and terminates the transient control as a result of this target injection quantity becoming greater than the target injection quantity at the normal control mode.

Furthermore, besides the isochronous speed control mode, an all speed control mode can also be used similarly as the speed control mode of the engine during the disengaged state of the clutch.

Figure 6:
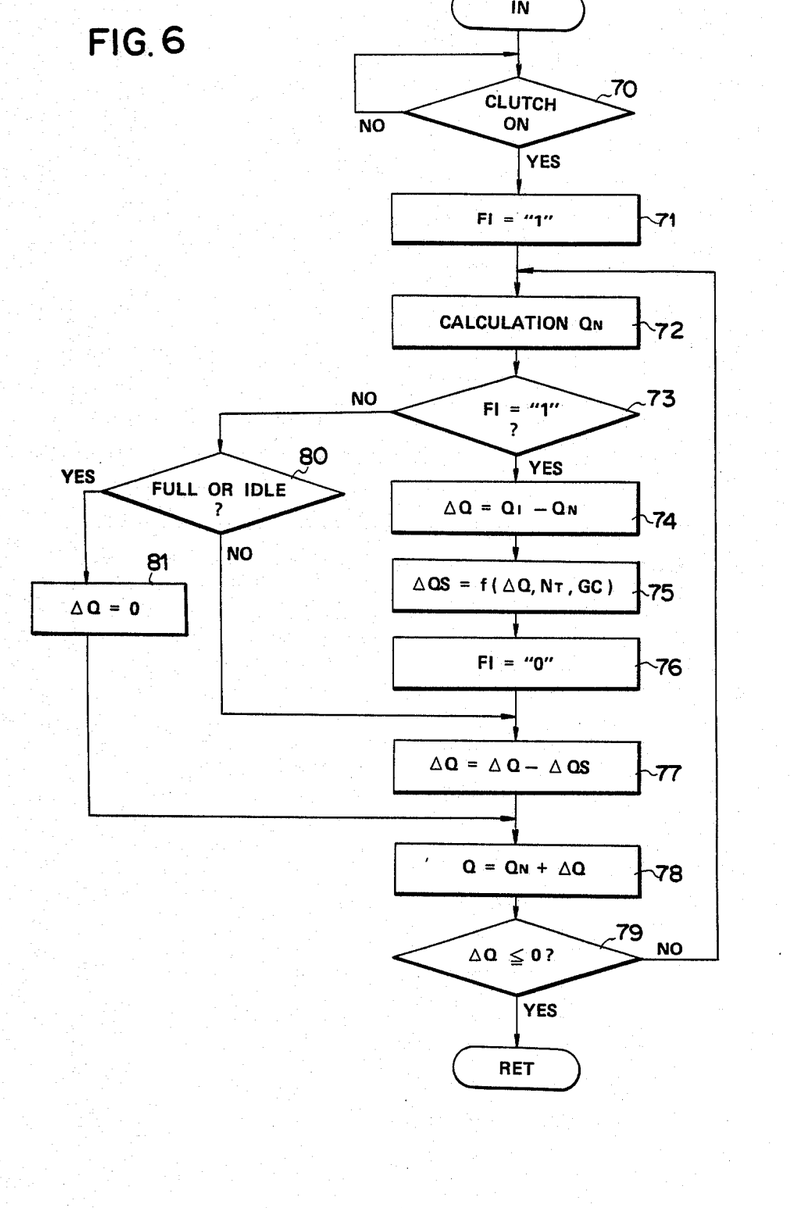
FIG. 6 is a detailed flowchart representing another algorithm for the transient control step.

FIG. 6 is a detailed flowchart representing another embodiment of the transient control step 46 shown in FIG. 4. In step 70, the decision is made in response to the clutch signal CL as to whether or not the friction-type clutch 5 is engaged and when the decision in step 70 is YES, the operation moves to step 71. In step 71, the flag FI representing whether or not the operation is entering the sub-routine for the first time is set, and the operation then moves to step 72 where the target fuel injection quantity $Q_N$ for controlling the speed of the engine 2 in the normal speed control mode is calculated with respect to the amount of operation of the acceleration pedal 14. After this, the operation proceeds to step 73, where a discrimination is made as to whether or not the flag FI is set, and when FI="1", the procedure moves to step 74 where the difference $\Delta Q$ between the target injection quantity $Q_I$ in the isochronous speed control mode, and the target fuel injection quantity $Q_N$ obtained in step 72, is calculated. This calculation is followed by step 75 wherein the quantity of change $\Delta QS$ of the target injection quantity which is changed for every program cycle is obtained by a map calculation based on the above-mentioned difference $\Delta Q$, the target engine speed $N_T$ at the time and the content GC of the speed-change control carried out in step 44 (e.g. shifting of the gear into the third position).

After this, the operation proceeds to step 76 where the flag FI is cleared, and then to step 77 where the amount obtained by subtracting the quantity of change $\Delta QS$ obtained in step 75 from $\Delta Q$ obtained in step 74 is set as a new $\Delta Q$. In the next step 78, the $\Delta Q$ which was set in step 77 is added to $Q_N$ and the added result is output as a target injection quantity Q.

In the following step 79, discrimination as to whether or not the value of $\Delta Q$ is below zero is carried out and in the case where $\Delta Q \leq 0$, the operation returns to step 72.

In step 72, the target injection quantity $Q_N$ is calculated for the second time on the basis of the amount of operation of the accelerator pedal 14 at that time and the procedure moves on to step 73. Since flag FI has already been reset at this time, the result of the discrimination in step 73 becomes NO and the operation moves to step 80. In step 80, a discrimination is made as to whether or not the position of the operation of the accelerator pedal 14 is in either a fully depressed position (Full) or a released idle position (Idle). In the case where the result of the discrimination in step 80 is NO, the procedure moves to step 77 in which the value of Q is determined by $\Delta QS$. In the case where the result of the discrimination in step 80 is YES, the procedure moves on to step 81, where $\Delta Q$ becomes 0, and this is followed by step 78.

As a result, unless the amount of operation of the accelerator pedal 14 is either Full or Idle, the value of the target injection quantity is decremented by $\Delta QS$ for every program cycle and the transient control is terminated when $\Delta Q < 0$.

If the amount of operation of the ccelerator pedal 14 becomes either Full or Idle, $\Delta Q$ becomes equal to zero and the decrementing operation of the target injection quantity is stopped.

Furthermore, although in the above-mentioned embodiment, a case was given in which a limit speed control mode was chosen as the normal speed control mode of the internal combustion engine, the present invention is not restricted to having a limit speed control mode for its normal speed control mode and the characteristic of the engine speed control can be selected freely.

The present invention is also suitable for use in a control apparatus for vehicles employing a wide variety of internal combustion engines such as diesel engines and gasoline engines.

We claim:

1. An apparatus for controlling an internal combustion engine for a vehicle provided with an electronically controlled automatic transmission system including a friction-type clutch and a gear-type transmission, said apparatus comprising:

means for producing condition data representing the operating condition of the vehicle;

means responsive to the condition data for calculating first target data representing the amount of fuel injection necessary for operating the internal combustion engine in accordance with the amount of operation of an accelerator pedal in a predetermined normal speed control mode;

means for generating second target data representing the amount of fuel injection necessary for operating the internal combustion engine at a required fixed speed in a predetermined specific speed control mode when said clutch is in its disengaged state;

a detecting means for producing a detection signal indicating the engaged/disengaged condition of the friction type clutch;

a first means responsive to the first and second target data and the detection signal for producing third target data representing a target amount of fuel injection which changes from the fuel quantity represented by the second target data to the fuel quantity represented by the first target data, with the passage of time, in response to the condition where the friction-type clutch is changed from a disengaged state to anengaged state;

a second means responsive to the first and third target data for discriminating whether or not the third target data is equal to the first target data;

a selecting means responsive to said second means and the detection signal for selecting one data from amongst the first, second and third target data according to the operating condition of the friction-type clutch, the second target data being selected when said clutch is in its disengaged state, the third target data being selected from a time said clutch is changing from its disengaged state to its engaged state to a time the third target data has reached the first target data, and the first data being selected after the third target data has reached the first target data in the case where said clutch is in its engaged state; and a third means for controlling the amount of fuel supplied to the internal combustion engine in accordance with the target selected by said selecting means so as to substantially reduce mechanical shock during the time of clutch engagement.

2. An apparatus as claimed in claim 1 wherein the condition data include at least data indicating the rotational speed of the internal combustion engine.

3. An apparatus as claimed in claim 1 wherein the predetermined normal speed control mode is a limit speed control mode in which only a maximum engine speed and an idling engine speed are controlled and governing operation is not effected in the medium engine speed range.

4. An apparatus as claimed in claim 1 wherein the predetermined specific speed control mode is an isochronous speed control mode in which the rotational speed of the internal combustion engine is maintained at a prescribed level.

5. An apparatus as claimed in claim 1 wherein the predetermined specific speed control mode is an all speed control mode in which the governing operation is carried out over the entire speed range, from idling engine speed to maximum engine speed.

6. An apparatus as claimed in claim 1 wherein said detecting means is a position sensor for detecting the position of a clutch plate of the fictiontype clutch, a signal indicating the position of the clutch plate being produced as the detection signal.

7. An apparatus as claimed in claim 1 wherein said first means comprises means responsive to the detection signal for detecting whether or not the friction-type clutch is engaged.

8. An apparatus as claimed in claim 1 wherein said first means comprises:
means for calculating a target engine speed for the second target data;
means for calculating the difference between the amount of fuel injection indicating by the first and second target data;
a determining means for determining the magnitude of the step by which the target engine speed is to be changed;
means for repetitively setting a new target engine speed according to the result of subtracting the step magnitude from the target engine speed; and
means for calculating the third target data in accordance with the new target engine speed.

9. An apparatus as claimed in claim 8 wherein said determining means determines the step magnitude based upon at least the target engine speed for the second target data and the difference between the amount of fuel injection indicated by the first and second target data.

10. An apparatus as claimed in claim 1 wherein said first means comprises:
means for calculating the difference between the amount of fuel injection indicated by the first and second target data;
means for determining the magnitude of the step by which the amount of fuel injection is to be changed; and
means for repetitively calculating the third target data in accordance with the first target data and the step magnitude.

11. An apparatus as claimed in claim 10 wherein the apparatus further comprises means for discriminating whether or not the position of the accelerator pedal is at either a full position or an idling position and the repetitive calculation for obtaining the third target data is carried out unless the accelerator pedal is in either the full position or the idling position.

* * * * *

UNITED STATES PATENT AND TRADEMARK OFFICE
CERTIFICATE OF CORRECTION

PATENT NO. : 4,807,132

DATED : February 21, 1989

INVENTOR(S) : Arai, Kenji et al.

It is certified that error appears in the above-identified patent and that said Letters Patent is hereby corrected as shown below:

Column 11, line 12, change "anengaged" to --an engaged--.

Column 12, line 5, change "fictiontype" to --friction-type--.

Column 12, line 17, change "indicating" to --indicated--.

Signed and Sealed this

Eighteenth Day of July, 1989

Attest:

DONALD J. QUIGG

Attesting Officer

Commissioner of Patents and Trademarks